United States Patent
Tevar et al.

(10) Patent No.: US 12,007,058 B2
(45) Date of Patent: Jun. 11, 2024

(54) ROBOTIC IN-PIPE INSPECTION

(71) Applicant: PLITZIE LLC, Powell, OH (US)

(72) Inventors: Amul D. Tevar, Powell, OH (US); Saeedeh Ziaeefard, Grove City, OH (US); Manish Pandya, King of Prussia, PA (US); Jacob Snedeker, Encinitas, CA (US)

( * ) Notice: Subject to any disclaimer, the term of this patent is extended or adjusted under 35 U.S.C. 154(b) by 195 days.

(21) Appl. No.: 17/682,480

(22) Filed: Feb. 28, 2022

(65) Prior Publication Data

US 2022/0282821 A1 Sep. 8, 2022

Related U.S. Application Data

(60) Provisional application No. 63/313,140, filed on Feb. 23, 2022, provisional application No. 63/312,949, filed on Feb. 23, 2022, provisional application No. 63/312,957, filed on Feb. 23, 2022, provisional application No. 63/155,383, filed on Mar. 2, 2021.

(51) Int. Cl.
| | |
|---|---|
| *F16L 55/44* | (2006.01) |
| *B25J 5/00* | (2006.01) |
| *B25J 19/02* | (2006.01) |
| *F16L 101/30* | (2006.01) |

(52) U.S. Cl.
CPC ............... *F16L 55/44* (2013.01); *B25J 5/007* (2013.01); *B25J 19/023* (2013.01); *F16L 2101/30* (2013.01)

(58) Field of Classification Search
CPC ........ F16L 55/44; F16L 2101/30; B25J 5/007; B25J 19/023
See application file for complete search history.

(56) References Cited

U.S. PATENT DOCUMENTS

| 9,657,884 B1 | 5/2017 | Carte et al. | |
|---|---|---|---|
| 11,560,977 B2 * | 1/2023 | Duncan | ................... F16L 55/34 |

* cited by examiner

*Primary Examiner* — Michael E Teitelbaum
(74) *Attorney, Agent, or Firm* — Thomas E. Lees, LLC (57) ABSTRACT

A robotic in-pipe inspection system having a front that moves independently of the rear. The system comprises a center shaft that has a connector that allows a front portion of the shaft to be at a desired angle from a rear portion of the shaft. A front leg assembly is operatively coupled to the front portion of the shaft, while a rear leg assembly is operatively coupled to the rear portion of the shaft. The front leg assembly comprises front legs that can be positioned at various angles relative to each other, while the rear leg assembly comprises rear legs that can similarly be positioned at various angles relative to each other. The system also includes a shaft controller (for controlling the desired angle of the center shaft), a front controller (for controlling the front leg assembly), and a rear controller (for controlling the rear leg assembly).

20 Claims, 5 Drawing Sheets

ROBOTIC IN-PIPE INSPECTION

CROSS REFERENCE TO RELATED APPLICATIONS

This application claims the benefit of U.S. provisional patent application Ser. No. 63/155,383, filed 2021 Mar. 2, by Pandya, Tevar, and Ziaeefard, and having the title "Infrastructure and Physical Asset Inspection"; U.S. provisional patent application Ser. No. 63/312,949, filed 2022 Feb. 23, by Pandya, Snedeker, and Tevar, and having the title "Inspection System Equipped with Dual Cameras"; U.S. provisional patent application Ser. No. 63/312,957, filed 2022 Feb. 23, by Snedeker and Tevar, and having the title "Camera with Moving Current of Air"; and U.S. provisional patent application Ser. No. 63/313,140, filed 2022 Feb. 23, by Snedeker and Tevar, and having the title "Inspection System with Ratcheting Track"; all of which are incorporated herein by reference in their entireties as if expressly set forth herein.

BACKGROUND

Field of the Disclosure

The present disclosure relates generally to inspection and, more particularly, to systems and processes for inspecting infrastructure and physical assets using robotics.

Description of Related Art

Routine inspection of infrastructure and maintenance of physical assets can be difficult when assets may be buried, have narrow access or located behind obstructions. For obstructed assets and tortuous infrastructure, there can be challenges associated with using traditional approaches to obtaining information, conducting routine inspection, emergency inspection, repairing or replacing assets, and delivering information about those assets. By way of example, pipeline networks transport fluids, such as gas, oil, water, sewage, etc., between key locations through an estimated total of 2.5 million kilometers (km) of global infrastructure. Other examples could be tanks or asset surfaces that can be accessed through narrow gaps or spaces. As such, it is important to inspect and maintain these pipelines and assets. Additionally, difficult to reach surfaces and structures can be interspersed throughout more easily accessible structures, making inspection more difficult.

SUMMARY

The present disclosure provides systems and methods for inspecting physical assets, delivery of sensors to infrastructure, and taking action on asset materials, structures, and systems. Briefly described, one embodiment comprises a robotic in-pipe inspection system having a front that moves independently of the rear. As such, for some embodiments, the system comprises a center shaft that has a connector that allows a front portion of the shaft to be at a desired angle from a rear portion of the shaft. A front leg assembly is operatively coupled to the front portion of the shaft, while a rear leg assembly is operatively coupled to the rear portion of the shaft. The front leg assembly comprises front legs that can be positioned at various angles relative to each other (in either asymmetrical or symmetrical orientations), while the rear leg assembly comprises rear legs that can similarly be positioned at various angles relative to each other (again, in either asymmetrical or symmetrical orientations). The system also includes a shaft controller (for controlling the desired angle of the center shaft), a front controller (for controlling the front leg assembly), and a rear controller (for controlling the rear leg assembly). The center shaft may have built-in flexibility or actuators and, furthermore, may serve as a mount for a variety of sensors, power supplies, actuators, deposition mechanisms, other inspection systems, or various remediation systems. For some embodiments, the robotic in-pipe inspection system comprises sensors that detect various conditions of the pipe or the fluid within the pipe. For other embodiments, the system is configured to move across, around, or up surfaces that have little-to-no curvature and move in and out of pipes, gutters, surfaces, vessels, and through debris.

Another embodiment compromises a system that has front and back legs that may move independently and dependently with each other. This system comprises of a central shaft that may have multiple degrees of articulation and control. The front leg assembly can be used to move the system in coordination but not necessarily in tandem with the back leg assembly. The legs in this embodiment may be asymmetric or be placed asymmetrically to enable an orientation for traversing, climbing, walking, running, crawling, or artificial gaiting across different surfaces. In this configuration, there is a fourth leg or actuator that is placed on the front assembly, back assembly, central shaft or on front assembly, back assembly and the central shaft. This fourth leg or actuator can be another leg that is used for movement or positioning or climbing, and/or an actuator that is used for manipulation and object interaction or repair, or a material treatment, evaluation or a surface modification device.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims. The preceding summary is to provide an understanding of some aspects of the disclosure. As will be appreciated, other embodiments of the disclosure are possible utilizing, alone or in combination, one or more of the features set forth above or described in detail below. Also, while the disclosure is presented in terms of exemplary embodiments, it should be appreciated that there are novel and non-obvious features that are described and shown with reference to individual aspects of the disclosure.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Pipeline networks transport fluids, such as gas, oil, water, sewage, etc., between key locations through millions of kilometers (km) of global infrastructure. Failure to adequately inspect or replace pipes results in failure, increased asset degradation, inefficiency, service disruption, and can result in loss of fluid transport, environmental damage, pollution, etc. Some of these pipes are inspected with advanced Pipeline Inspection Gauges (PIGs), which are placed into the pipes and driven by the flow of the fluid within the pipes. However, the PIGs are unable to adapt to sharp changes in pipe direction or pipe diameter and, therefore, it is difficult (if not impossible) to inspect pipes with complex structures (e.g., branches, changes in direction, etc.). These complex infrastructures are known as unpiggable networks. Furthermore, there are other environments with enclosed surfaces and isolated volumes (e.g., ships, submarines, other water-based systems, etc.), which can have highly corrosive environments that are difficult to inspect. Other inspection systems can use a variety of movement approaches to deliver sensors or other systems inside of pipelines to inspect, repair or unblock flows.

Constrained and narrow space inspection also remains a critical point of inspection for a variety of systems. This can include difficult-to-access infrastructure (e.g., drainage in older bridges, gutters, inside support and build structures in vehicles and surfaces that are behind tanks in ships that still require inspection and treatment but are difficult to physically reach, etc.). Fiber optic snakes and wheeled robotic systems do exist to try and inspect these systems, but the difficulty remains due to varying and often custom nature of the environments that may require movement from pipe to surface to partially enclosed or non-linear movement spaces inside assets.

In one embodiment, to address the difficulties associated with inspecting unpiggable networks (and other complex pipeline or infrastructure configurations), the present disclosure teaches a robotic inspection system having a front that moves independently of the rear. The system allows a front portion to be at a desired angle from a rear portion, thereby allowing the system to accommodate sharp changes in direction or branching within a pipeline infrastructure. A front leg assembly and a rear leg assembly allow for independent front and rear movements, respectively. The front leg assembly comprises front legs that can be positioned at various angles relative to each other, while the rear leg assembly comprises rear legs that can similarly be positioned at various angles relative to each other. The various angles allow the robotic system to accommodate pipes with varying diameters or, sometimes, pipes that change their internal diameters over a particular pipe length. The system also includes controllers (for controlling the leg assemblies) and sensors that detect various conditions of the pipe or the fluid within the pipe.

In another embodiment, the front and rear leg assemblies operate in a staggered or mixed leg-to-leg or leg-to-assembly approach depending on the application and constraints of the space. The front and rear leg assembly can be operated in tandem by varying the degree of actuation or operating different legs at different rates or extensions. This embodiment can allow for different dragging, walking, or mobility paths enabling the robot to change between enclosed, semi-enclosed, and open structures.

Having provided a broad technical solution to a technical problem, reference is now made in detail to the description of the embodiments as illustrated in the drawings. Specifically, FIGS. 1 through 4B show different embodiments of a robotic inspection system capable of in-pipe, featured surface, and in-pipe-and-surface inspection that can move between different types of structures. For purposes of clarity, this disclosure explains mechanical components of the robotic in-pipe inspection system 100 first and, thereafter, explains in detail control elements of the robotic in-pipe inspection system 100. Thereafter, this disclosure describes the embodiment in FIG. 2 in detail, emphasizing the differences between the embodiment of FIG. 1 and the embodiment of FIG. 2. Additional embodiments are shown and described with reference to FIGS. 3, 4A, and 4B.

Although several embodiments are described in connection with these drawings, there is no intent to limit the disclosure to the embodiment or embodiments disclosed herein. On the contrary, the intent is to cover all alternatives, modifications, and equivalents.

With this in mind, the mechanical components of the robotic in-pipe inspection system 100 are explained first.

First Embodiment of Robotic Inspection System

Figure 1:
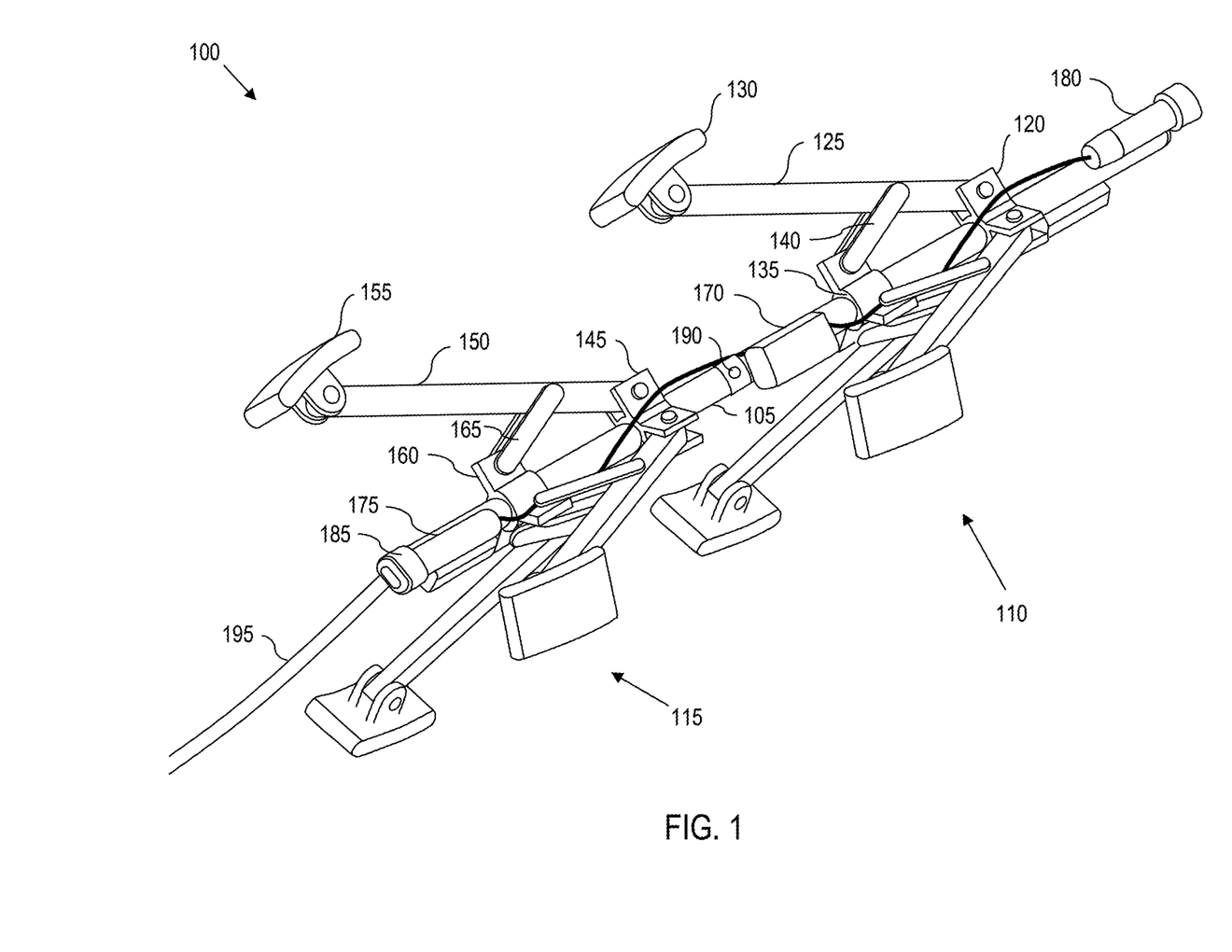
FIG. 1 is a diagram showing a perspective view of one embodiment of a robotic in-pipe inspection system.

FIG. 1 shows one embodiment of a robotic in-pipe inspection system 100 with a center shaft 105, a front leg assembly 110, and a rear leg assembly 115. The front leg assembly 110 is mechanically and/or chemically coupled to the shaft at a shaft front portion, while the rear leg assembly 115 is mechanically and/or chemically coupled to the shaft at a shaft rear portion.

The front leg assembly 110 comprises a front leg connector 120 that is mechanically coupled (preferably anchored) to the shaft front portion. In the embodiment of FIG. 1, at least two (2) front legs 125 are each mechanically and pivotally coupled to the front leg connector 120 at their respective proximal ends, thereby allowing the front legs 125 to pivot at various angles (designated as front angles) with reference to the center shaft 105. For some embodiments, the front legs 125 can collapse to reduce the front angles to, for example, less than five degrees (5°) or extend beyond (180°), thereby allowing for the assembly to be placed through an aperture that is much smaller than the actual inside of a pipe. For some embodiments, the configuration of the legs can be changed to a reverse-leg orientation or other configurations as the system encounters changes in pipe orientation, diameter, obstacles, or other features. This embodiment shown in FIG. 1 has 3 legs asymmetrically placed but it can also have 2 legs, 4, 5, 6, 7 or multiples to enable better traction in a symmetric or symmetric fashion.

Each of the front legs 125 is positioned at a respective azimuthal position, thereby azimuthally separating the front legs 125 from each other at desired azimuthal angles. For embodiments that have only two (2) front legs 125, an azimuthal angle between the front legs 125 (designated as front azimuthal angle) of approximately one-hundred-and-eighty degrees (180°) provides front legs 125 that face away from each other and, therefore, provide a greater level of stability when the front legs 125 are used cooperatively to apply pressure against an inside surface of a pipe wall (also similar to known inchworm or modified inchworm locomotion). As one can appreciate, for other embodiments comprising three (3) legs, the front azimuthal angles of approximately one-hundred-and-twenty degrees (120°) provides a tripod-like structure for securing the in-pipe robot; for four (4) legs, the front azimuthal angles of approximately ninety degrees (90°) extends the legs at equiangular positions (e.g., 3 o'clock, 6 o'clock, 9 o'clock, and 12 o'clock), and so on. In other words, for inchworm movement, the front legs 125 can be placed at azimuthal positions that exhibit axial symmetry about the center shaft 105. These angles are not limited to the above mentioned, but are here used to teach one embodiment of the technology.

Because the robotic in-pipe inspection system 100 accommodates varying numbers of front legs 125, some embodiments also allow for modular adding or removing of front legs 125 as needed for various desired uses. Additionally, because the azimuthal positions of each leg 125 is adjustable, one of the legs 125 can be configured as a robotic arm with different attachments, such as a spray attachment (with adhesives, or liquids, or whatnot), a cutting attachment (e.g., rotating blade, etc.), a sealing attachment (e.g., to plug a hole, etc.), a cleaning attachment (e.g., a rotary brush or abrasive tool), a deposition tool (e.g., pipe-in-pipe or patches), a sensor (e.g., electromagnetic or multispectral or hyperspectral), a tread movement system and so on. An embodiment of a robotic arm and its operation is explained in greater detail with reference to FIG. 2, below.

For embodiments in which the front legs 125 are used for walking (also known as a modified walking locomotion configuration), it is desirable to have the front legs 125 facing substantially in the same direction and, therefore, the front azimuthal angles can be approximately sixty degrees (60°), approximately thirty degrees (30°), or other angles that are less than right angles. These smaller angles allow for faster locomotion of the in-pipe robot (in walking mode) than when the front legs are separated by substantially equal angles (in inchworm mode). In other words, the front legs 125 can be placed at azimuthal positions that exhibit axial asymmetry about the center shaft 105.

For some embodiments, one or more of the front legs 125 have an adjustable length or additional joints for support and/or mobility, which permits both extension and contraction while also allowing for the pivoting motion at the front leg connector 120. By way of example, in some embodiments, the front legs 125 comprise artificial muscles, which contract or extend with selective application of electric current or controlled chemical potentials to the front legs 125. In other embodiments, the front legs 125 are selectively telescoping legs. In other embodiments, the front legs 125 have multiple joints or actuators that allow off-axis movement.

Continuing with FIG. 1, each of the front legs 125 is also mechanically coupled at its respective distal end to a respective front foot 130. Preferably, each front foot 130 is mechanically and pivotally coupled to the distal end of its respective front leg 125, thereby allowing the feet 130 to exhibit various ranges of pivoting motions or changing diameters or surface contract points for changing pipes or surfaces. In some embodiments, the feet 130 are modular and, therefore, selectively detachable from the front legs 125. This allows for the feet 130 to have different types of surfaces that allow temporary adhesion to the inner surface of the pipe. Thus, for example, the feet 130 can be specifically chosen to accommodate pipe inner surfaces that are made of iron, wood, plastic, glass, polymer, ceramic, composites, other metals or a host of other materials (or combinations thereof), or any coating material that can be applied to any of these materials. Direct contact may occur with the inner or outer surfaces through liquids, debris, dirt or other materials or substances that may come in contact with the foot and the surface. The foot 130 may also use adhesive to maintain contact and/or pressure to maintain contact with the surface.

For some embodiments, an adaptable force is applied to the feet 130. Thus, for example, if the pipe that is under inspection is made from a softer or more-pliable material, then a lesser force is applied to prevent the feet 130 from damaging the softer or more pliable pipe material. Alternatively, if the pipe is made from a harder and less-pliable material and the inner surface of the pipe has a reduced coefficient of friction (e.g., from slime or other buildup), then a greater force is applied to prevent the feet 130 from slipping. Known sensory feedback mechanisms can be employed to permit remote regulation of the forces that are applied to the feet 130.

In addition to the front leg connector 120, the robotic in-pipe inspection system 100 comprises a front slider 135 that is slidably coupled to the shaft 105. Each of the front legs 125 is mechanically coupled to the front slider 135 through its respective front lever arm 140. For some embodiments, additional front lever arms 140 can be added for additional support or for accommodating additional front legs 125. In this configuration, movement of the front slider 135 along the center shaft 105 results in forces being applied to the front legs 125 by the front lever arms 140 to pivot the front legs 125 at the front leg connector 120. The slider 135 may also have a separate actuator that enables the robotic system to achieve various angles or orientations between the different front and rear assemblies and front and/or front-and-rear-assembly actuators Similar to the front leg assembly 110, the rear leg assembly 115 comprises a rear leg connector 145 that is mechanically coupled (preferably anchored) to the shaft rear portion. At least two (2) rear legs 150 are each mechanically and pivotally coupled to the rear leg connector 145 at their respective proximal ends, thereby allowing the rear legs 150 to pivot at various angles (designated as rear angles) with reference to the center shaft 105.

Each of the rear legs 150 is positioned at a respective azimuthal position, thereby azimuthally separating the rear legs 150 from each other at desired azimuthal angles. It should be appreciated that, for some embodiments, the azimuthal angles for the rear legs 150 need not be the same as the azimuthal angles for the front legs 125 (meaning, for example, the front legs 125 are configured for inchworm movement, while the rear legs 150 are configured for walking movement). However, for other embodiments, the azimuthal angles for both the front legs 125 and the rear legs 150 are the same (e.g., both set for inchworm movement or both set for walking movement), thereby allowing for azimuthal angle control of both sets of legs 125, 150 concurrently. Similar to the modularity of the front legs 125, the robotic in-pipe inspection system 100 accommodates varying numbers of front legs 125, some embodiments also allow for modular adding or removing of front legs 125 as needed for various desired uses.

It should be appreciated that the ability of the robotic in-pipe inspection system 100 to switch from inchworm mode to walking mode permits variable and adjustable locomotive speeds, diameter changes, pipe-to-surface changes, surface walking, surface-to-pipe motion, and multiple surface mobility. For example, in walking mode, the robotic in-pipe inspection system 100 can move faster because not all legs 125, 150 need to be fully (or sufficiently) extended to fit the inner diameter of a pipe. Conversely, in inchworm mode, the movement might be slower or faster dependent on conditions or operator, but appropriate extension of all legs 125, 150 provides stability to the robotic in-pipe inspection system 100 within the pipe.

Additionally, the ability to switch between different gaits could be used to move around debris or objects in the system path more easily.

Each of the rear legs 150 is also mechanically coupled at its respective distal end to a respective rear foot 155. Preferably, each rear foot 150 is mechanically and pivotally coupled to the distal end of its respective rear leg 150, thereby allowing the feet 155 to exhibit various ranges of pivoting motions. Similar to the front feet 130, some embodiments of the rear feet 150 are selectively detachable (or modular) and the contact surface of the rear feet 150 are configurable for many different types of pipe inner surfaces.

The front and rear feet may terminate in a variety of materials, sensors embedded in those materials, magnetic materials, adhesive materials, or any combination thereof.

In addition to the rear leg connector 145, the robotic in-pipe inspection system 100 comprises a rear slider 160 that is slidably coupled to the shaft 105. Each of the rear legs 150 is mechanically coupled to the rear slider 160 through its respective rear lever arm 165. With this configuration, movement of the rear slider 160 along the center shaft 105 results in forces being applied to the rear legs 150 by the rear lever arms 165 to pivot the rear legs 150 at the rear leg connector 145.

Having described the mechanical components of the robotic in-pipe inspection system 100, the control elements are now explained in detail.

As explained, above, the feet 130, 155 are designed to contact the inner surface of a pipe or surface that the feet will traverse. As such, for some embodiments, sensors (not shown or labeled) are integrated into the feet 130, 155, thereby allowing the robotic inspection system 100 to detect the type of surface contacted by the feet 130, 155. The ability to detect the type of surface permits the robotic inspection system 100 to apply an appropriate amount of force to the legs 125, 150 (and consequently the feet 130, 155) to maintain contact with the inner surface. It should be appreciated that such sensors can be located on any of the feet, whether it be on a single front foot 130 (or multiple front feet 130), a single rear foot 155 (or multiple rear feet 130), or on a combination of front feet 130 and rear feet 155.

Next, the front leg assembly 110 is operatively coupled to and controlled by a front controller 170, while the rear leg assembly 115 is operatively coupled to and controlled by a rear controller 175. For some embodiments the front controller 170 and the rear controller 175 are controlled independently and operate independently of each other, while in other embodiments the operation of the rear controller 175 is dependent on the operation of the front controller 170, and vice versa. The front controller 170 controls the mechanical movements of the front legs 125, the front slider 135, and the front lever arms 140, thereby controlling both the pivotal angles of the front legs 125 and the azimuthal angles of the front legs 125. Similarly, the rear controller 175 controls the mechanical movements of the rear legs 150, the rear slider 160, and the rear lever arms 165, thereby similarly controlling the pivotal angles and the azimuthal angles of the rear legs 150.

The ability to control independently the front leg assembly 110 and the rear leg assembly 115 allows both forward and backward movement of the robotic in-pipe inspection system 100. Furthermore, the ability to control both the front leg assembly 110 and the rear leg assembly 115 permits the robotic in-pipe inspection system 100 to examine pipes that have different diameters or move between pipes and surfaces. Additionally, because the leg assemblies 110, 115 are controllable independently with the front controller 170 and the rear controller 175, the robotic in-pipe inspection system 100 can accommodate (to a certain extent) pipes with changing diameters along a travel path of the robotic in-pipe inspection system 100. Thus, in operation, the front controller 170 is operatively coupled to the front leg assembly 110, with the front controller 170 controlling the angle between the center shaft 105 and the front legs 125. Similarly, the rear controller 175 is operatively coupled to the rear leg assembly 115, with the rear controller 175 controlling the angle between the center shaft 105 and the rear legs 150. By controlling these angles, the robotic in-pipe inspection system 100 allows the legs 125, 150 to collapse to angles as small as five degrees (5°), thereby allowing the robotic in-pipe inspection system 100 to collapse for transport, launch, extraction, movement around objects, etc. In other words, the maximum cross-sectional diameter of the robotic in-pipe inspection system 100 can be reduced to permit insertion or launch through an orifice that is smaller than the actual inner diameter of the pipe or access port to area for inspection.

For some embodiments, the robotic in-pipe inspection system 100 further comprises a front sensor 180 or a rear sensor 185, or both (collectively designated as sensors 180, 185). Based on the particular need, the front sensor 180 can be an optical camera or a multi-aperture camera (for acquiring digital images of the inside of the pipe), an acoustic sensor (for acquiring acoustic characteristics within the pipe), a thermal imager or thermal imaging sensor (for determining thermal properties in the pipe), a methane gas detector or other chemical detector (for detecting chemical properties, chemical leaks, or chemical anomalies in the pipe), a water quality detector (for detecting water quality in a pipe), a non-destructive evaluation sensor (for determining structural integrity or structural problems within a pipe), a motion sensor (for detecting particulate motion in the pipe or estimating fluid flow in the pipe), a laser based interrogation device (for detection objects or mapping), an electromagnetic based sensor (for detection pipe properties or material structures), a touch based sensor (to measure surface features in debris, colloid, electromagnetically noisy, wet or dirty environments), or any other type of sensor. The rear sensor 185 can be the same type of sensor as the front sensor 180 or, in the alternative, a different type of sensor, thereby allowing for acquisition of multiple different types of data from a single robotic in-pipe inspection system 100.

To the extent that the sensors 180, 185 acquire data from inside of the pipe, the robotic in-pipe inspection system 100 has an ability to store the acquired data. For some embodiments, the data is stored in an onboard data storage unit (not shown) that is operatively coupled to one or more of the sensors 180, 185. Alternatively, the data is stored externally or remotely from the robotic in-pipe inspection system 100, which requires the sensors 180, 185 to transmit the data to the storage unit (not shown). For those types of remote storage units, the robotic in-pipe inspection system 100 comprises a transmitter (not shown) that is operatively coupled to the sensors 180, 185, thereby allowing the data from the sensors 180, 185 to be transmitted from the robotic in-pipe inspection system 100 to the remote storage units. Because data storage units (e.g., hard drives, memory cards, or other digital logic for storing information) and transmitters are both well known in the art, further discussions of such storage units or transmitters are omitted here. The system may also house wireless communications systems or a mix of wireless and wired connections within different sections of the robot and the base station, allowing some parts of the system to wirelessly send information to other parts or the base station.

An offboard storage system may also be used that has a physical connection for data transfer (e.g., tethering) or a mixed data signal system may be used to transmit through the environment to the receiver (e.g., repeater, wireless signals, electromagnetic node, remote control base).

In a preferred embodiment, the center shaft 105 comprises a shaft connector 190 that mechanically couples the shaft front portion to the shaft rear portion. For example, the shaft connector 190 comprises a universal joint that allows the shaft front portion to be positioned at various angles with reference to the shaft rear portion (e.g., between ninety degrees (90°) and one-hundred-and-eighty degrees (180°)). For convenience, this angle is denoted herein as the shaft angle. By providing for independent positioning of the front with reference to the back, the robotic in-pipe inspection system 100 can make major angle turns. Providing a shaft angle also permits the front of the robotic in-pipe inspection system 100 to inspect off-path branches or lateral areas that are within the turning angle or reach of the front portion as compared to the rear portion.

As one can appreciate, the shaft connector 190, for other embodiments, can comprise an attachment rod (not shown) with a front end that is affixed to the shaft front portion through a front joint and a back end that is affixed to the shaft rear portion through a back joint. For some embodiments, the front joint and the back joint are universal joints, thereby allowing for pivotal movement in all directions. Insofar as universal joints and attachment rods are well known in the art, and thus there is no need for a description or an explanation of universal joints or attachment rods, this disclosure provides no further discussion, drawing, or depiction of universal joints or attachment rods or support structures.

Similar to how the front controller 180 controls the front leg assembly 110 and the rear controller 185 controls the rear leg assembly 115, the robotic in-pipe inspection system 100 further comprises a shaft controller (not shown) that controls the shaft connector 190. Specifically, the shaft controller (not shown) is operatively coupled to both the shaft front portion and the shaft rear portion and controls the shaft angle. Similar to the controlling of the front leg assembly 110 and the controlling of the rear leg assembly 115, the shaft connector 190 can be controlled remotely. Also, for some embodiments, the shaft connector 190 can be controlled independently of the front controller 180 or the rear controller 185. For other embodiments, control of the shaft connector 190 can be dependent on the control of either the front leg assembly 110 or the rear leg assembly 115 or both.

In some embodiments, the system has onboard systems that let it control movement and function without external control in an autonomous or semi-autonomous or non-autonomous control scheme. Additionally, the system may have sensors and software that can detect features or readings of interest and interrupt, modify, notify, or change the control scheme in real time.

As shown in FIG. 1, for some embodiments the robotic in-pipe inspection system 100 comprises a tether 195. The tether 195 can serve many different functions. For example, in some embodiments, the tether 195 provides power to any one of the controllers (e.g., shaft controller, front controller 170, and rear controller 175) or to any one of the sensors 180, 185. For other embodiments, the tether 195 provides control signals to one or more of the controllers 170, 175 or sensors 180, 185. For yet other embodiments, the tether 195 includes data lines that allow for data transmission from the sensors 180, 185 to a remote storage device or a remote analyzer. For embodiments that do not supply power through the tether 195, the robotic in-pipe inspection system 100 can be parasitically powered using the flow fields that surround the robotic in-pipe inspection system 100. In other embodiments, power is provided by a base station or launch point or feature that is in or on the pipe wall itself (e.g., wireless charger).

Near-Completely Collapsible Embodiment

Although some conventional systems permit retraction of the legs to a certain degree, those conventional systems do not allow for a near-complete collapse of the legs for various functional reasons. Unlike conventional systems, for some embodiments of the robotic in-pipe inspection system 100, the front leg assembly 110, the rear leg assembly 115, or both, are almost completely collapsible, thereby providing the smallest geometric cross section for the robotic in-pipe inspection system 100.

Using the rear leg assembly 115 for purposes of illustration, enough room is provided on the center shaft 105 for the rear leg connector 145 to slide far enough so that the pivot angle between the rear legs 150 and the rear lever arms 165 extends to nearly a straight angle (i.e., 180° angle). In other words, the rear lever arms 165 become nearly flush with the center shaft 105.

Those having ordinary skill in the art will appreciate that the front leg assembly 110 is also near-completely collapsible. Thus, depending on the goals of the system operator, the front leg assembly 110 can be collapsed independently of the rear leg assembly 115. Alternatively, the two leg assemblies 110, 115 can be collapsed in a coordinated manner.

By permitting near-complete collapsibility, the robotic in-pipe inspection system 100 is easily deployable into a pipe or removable from the pipe because there is less risk of the legs 125, 150 becoming hooked or anchored to an obstacle within the pipe. Additionally, if the robotic in-pipe inspection system 100 is collapsed by default, then the system 100 will collapse when the robotic in-pipe inspection system 100 loses power (or experiences some other type of malfunction that triggers the system's default mode). Consequently, in the event of an emergency or an unexpected shutdown, the collapsed-by-default system 100 will not remain stuck in the pipe but, instead, is removable by simply dragging out the system 100 by its tether 195. Additionally, the collapsibility can also enable easier storage and transport of the system, or enable it to be launched, retrieved, or stored in unique ways. The collapsible system could enable the robotic inspection system to be already in a space on standby and ready to act while there is fluid or gaseous flow around it.

Dual-Camera Embodiment

It should be noted that, for some embodiments, the front sensor 180 is a targeted-field-of-view inspection camera that focuses on particular areas of interest within the pipe, while the rear sensor 185 is a robot-body-facing wider-angle camera that shows the entire or part of the robotic in-pipe inspection system 100. This dual-camera embodiment permits visible examination of both the robotic in-pipe inspection system 100 itself (with the robot-body-facing wider-angle camera 185), environmental context for human observers and operators, and the conditions of the pipe and obstacles within the pipe (with the inspection camera 180).

As such, the dual-camera embodiment provides a mechanism to remotely monitor the status of the system 100, including the condition of the tether 195 (e.g., whether the tether 195 is tangled, etc.), the approach angles of different parts of the robot to pipeline or constrained space features.

The ability to remotely monitor the system 100 itself facilitates manual remote control of the system 100 because both the system 100 and the environment in which it is deployed can be viewed together, allowing an operator that is physically near the system to understand what type of environment, features, or detections that the system is or will undergo. This could be the operator being able to see the robot before it enters a fluid filled section or tank or that an intersection is arriving and the robot needs to choose a direction.

It should be appreciated that, depending on the desired embodiment, the robot-body-facing camera comprises a wide-angle lens, a fish-eye lens, a rectilinear lens, or any other type of lens that accommodates a desired outcome. Also, depending on where other sensors or extensions might be placed on the system, the robot-body-facing camera can be a rear-facing forward sensor (looking back at the system opposite the direction of travel) or a forward-facing rear sensor (looking forward at the system in the direction of travel). Similarly, the targeted field-of-view inspection camera can be a forward-facing forward sensor (looking ahead) or a backward-facing rear sensor (looking behind). Furthermore, depending on what precisely is being observed, the targeted field-of-view inspection camera can be a high-resolution camera, an infrared camera, an ultraviolet camera, or any other type of camera for visually inspecting an area of interest.

Second Embodiment of Robotic Inspection System

Figure 2:
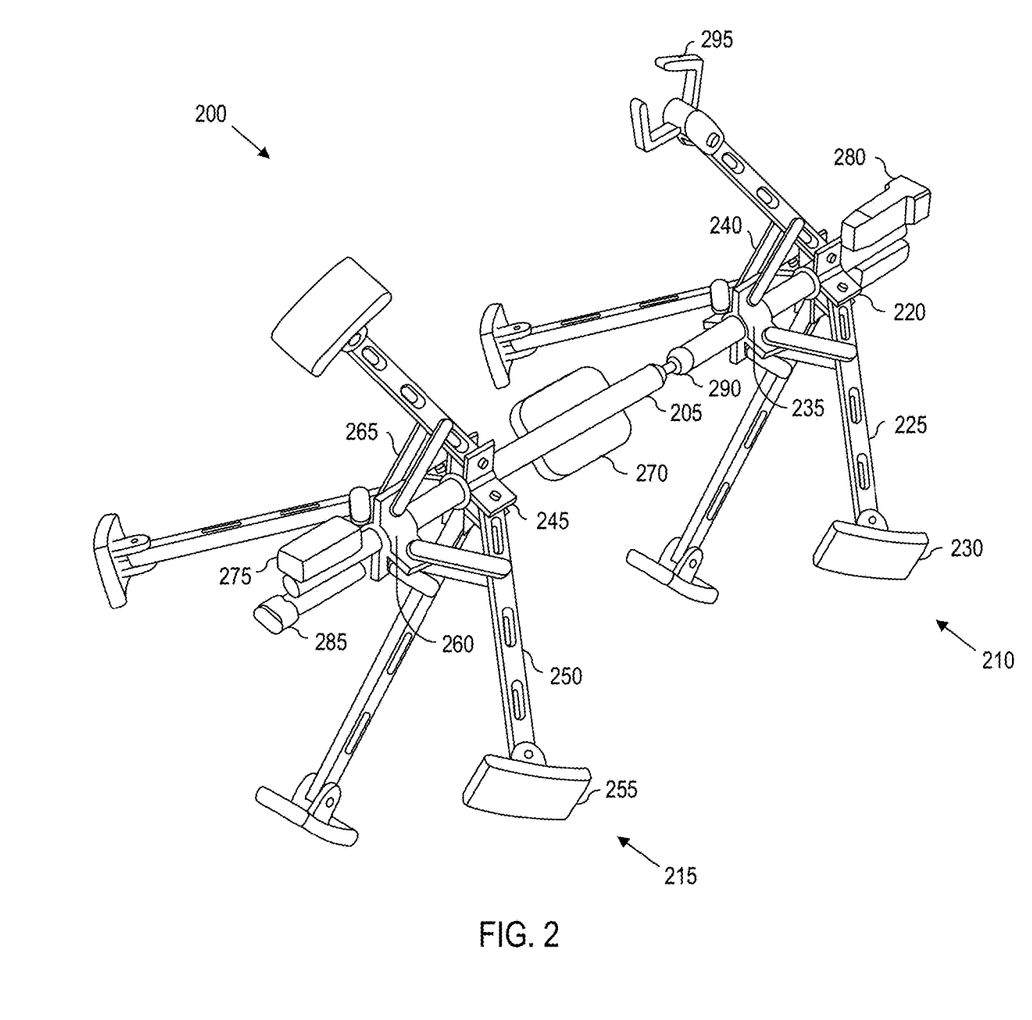
FIG. 2 is a diagram showing a perspective view of another embodiment of a robotic in-pipe inspection system.

Turning now to FIG. 2, another embodiment of a robotic in-pipe inspection system 200 is shown. Similar to the robotic in-pipe inspection system 100 of FIG. 1, the embodiment of FIG. 2 comprises a center shaft 205, a front leg assembly 210, a rear leg assembly 215, a front leg connector 220, front legs 225, front feet 230, a front slider 235, front lever arms 240, a rear leg connector 245, rear legs 250, rear feet 255, a rear slider 260, rear lever arms 265, a rear controller 275, a front sensor 280, a rear sensor 285, and a shaft connector 290. Insofar as these components are discussed in detail with reference to FIG. 1, no further discussion of these components is provided with reference to FIG. 2.

Unlike FIG. 1, however, the robotic in-pipe inspection system 200 of FIG. 2 comprises a logic board 270 and a robotic arm 295. For the embodiment of FIG. 2, the logic board 270 is positioned on the center shaft 205 between the front leg assembly 210 and the rear leg assembly 215. Placing the logic board 270 toward the middle of the robotic in-pipe inspection system 200 protects the logic board 270, should there be debris either in front of the robotic in-pipe inspection system 200 as it travels forward, or behind the robotic in-pipe inspection system 200 as it travels backward. Those having skill in the art will appreciate that, in place of the logic board 270, actuator mounts, sondes, heaters, inspection tools, mapping sensors, physical sensors, additional actuators mounted with sensors, sensor cleaners or other suitable devices are mountable toward the middle of the robotic in-pipe inspection system 200. For those alternative configurations, one can appreciate that the robotic in-pipe inspection system 200 can have redundant sensors at various locations on the robotic in-pipe inspection system 200 (e.g., front, rear, and middle).

Modular Embodiment

Figure 3:
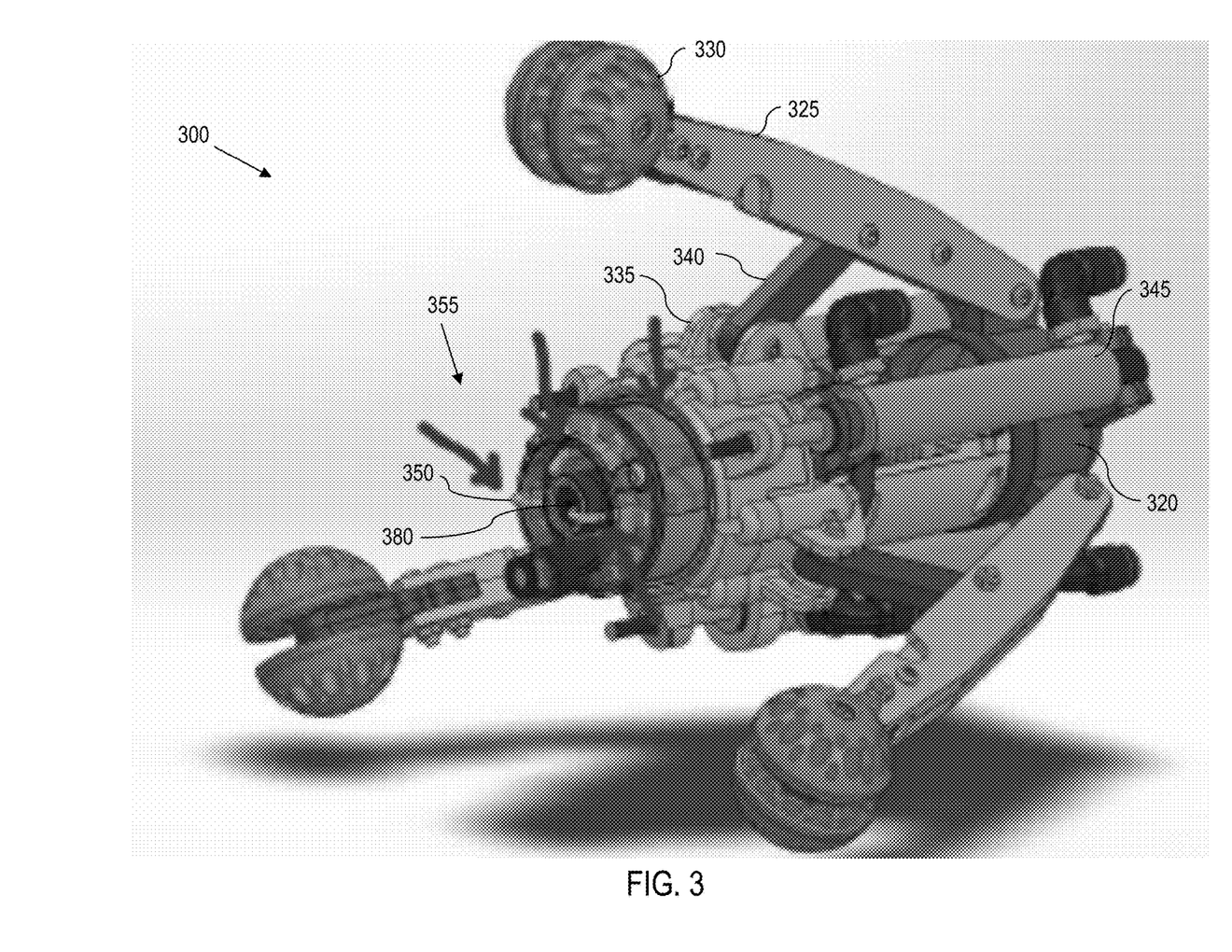
FIG. 3 is a diagram showing one embodiment of a modular replacement module having an air shield.

With this in mind, attention is turned to FIG. 3, which shows a diagram of a replaceable module 300, which can modularly replace either the front leg assembly 110, 210 or the rear leg assembly 115, 215. Although modular replacement is described herein, it should be appreciated by those having skill in the art that replacement encompasses attachment, detachment, reattachment, positioning, repositioning, orienting, reorienting, combining, and so on. In other words, and by way of example, a replaceable module does not necessarily mean that the module is being replaced by a different module but, rather, a replaceable module illustrates the ability to attach, detach, position, orient, etc.

Continuing, similar to the robotic in-pipe inspection systems 100, 200 of FIG. 1 or 2, the embodiment of FIG. 3 also comprises legs 325, a slider 335, lever arms 340, a leg connector 320, and a camera 380. Insofar as these components have already been discussed in detail with reference to FIGS. 1 and 2, no further discussion of these components is provided with reference to FIG. 3. Unlike either FIG. 1 or FIG. 2, the replaceable module comprises wheels 330 (instead of feet 130, 230), which are rotationally mounted to the ends of their respective legs 325, thereby demonstrating the modularity of both the leg assemblies 115, 215 as well as the modularity of some of the individual the components (e.g., feet 130, 230, wheels 330, cameras and sensors 180, 185, 280, 285, etc.) in the leg assemblies 115, 215.

The modularity of the system 100, 200, 300 provides greater flexibility to inspect different types of pipes with different types of internal environments. Additionally, the modularity permits easier assembly and disassembly for repairs, thereby permitting faster and easier field repairs. In other words, although the components work cooperatively as a whole, many of the separate components are independently removable. Furthermore, sensors 180, 185, 280, 285 are replaceable or swappable or movable to different locations on the system 100, 200, 300, thereby allowing for greater functionality.

As those with skill in the art will appreciate, the swappable components are not limited to sensors 180, 185, 280, 285, feet 130, 230, 330, and leg assemblies 115, 215. Apart from the central control system itself (not shown), many of the other components, including motors, pneumatic actuators, electrical actuators, tethers 195, etc., are modularly swappable or replaceable in different embodiments. Examples are not limited to communication options (e.g., wired, wireless, optical, sonic), power options (e.g., tethered, battery, fuel cell, environmental harvest based), mobility options (inch-worm, tracked, wheeled, mixed), tool options (e.g., spray, deposit, sensor deposits, tags), repair options (e.g., sealants, coatings, deposits, replacement sections), other robots (larger or smaller system launch), and other options that would enable modular and flexible options.

Air Shield Embodiment

The replaceable module 300 of FIG. 3 further comprises pneumatic actuators 345 that control the slider 335, which in turn controls collapsing and expanding of the legs 325 via the leg connectors 340. Because the pneumatic actuators 345 are driven by air, a near-constant supply of pressurized air is supplied to the pneumatic actuators 345.

The embodiment of FIG. 3 also includes air hoses 350 (or other types of channels), which direct exhaust air from the pneumatic actuators 345 to the camera 380, thereby creating an air shield 355 in front of the camera 380. The air shield 355 provides bursts of pressurized air to the lens of the camera 380. The pressurized air removes dirt, debris, water, mud, oil, film, biological debris, and other particulate contaminants from the lens of the camera 380, thereby resulting in a clearer image from the camera 380.

The air shield 355 is also configurable to provide an air current in front of the camera 380, thereby forming a shield or wall of air, which shields the camera 380 and reduces the likelihood that particulate contaminants that are floating in front of the camera 380 would adhere to the lens. In other words, by providing a moving current of air in front of the camera 380, the air shield 355 reduces debris build-up on the camera 380 (more specifically, the lens of the camera 380).

Of course, those having skill in the art will appreciate that pressurized air need not be supplied through exhausted air from pneumatic actuators 345. In alternative embodiments, a separate line for pressurized air can be implemented through the tether (not shown in FIG. 3). For other embodiments, the air shield 355, in addition to keeping the camera 380 clean, is used to blow off dirt or dust from the inside wall of the pipe itself, thereby providing a less obstructed view of the condition of the pipe wall. Additionally, different surface treatments would be used to provide different repulsion, adhesion or contact control between the lens surface and environment. The air channels could also be used to apply different solutions or treatments to change, repair, clean, or maintain the lens as it encounters different features, objects, chemicals or debris from the environment.

Embodiments That Combine Different Modes of Mobility

Figure 4A:
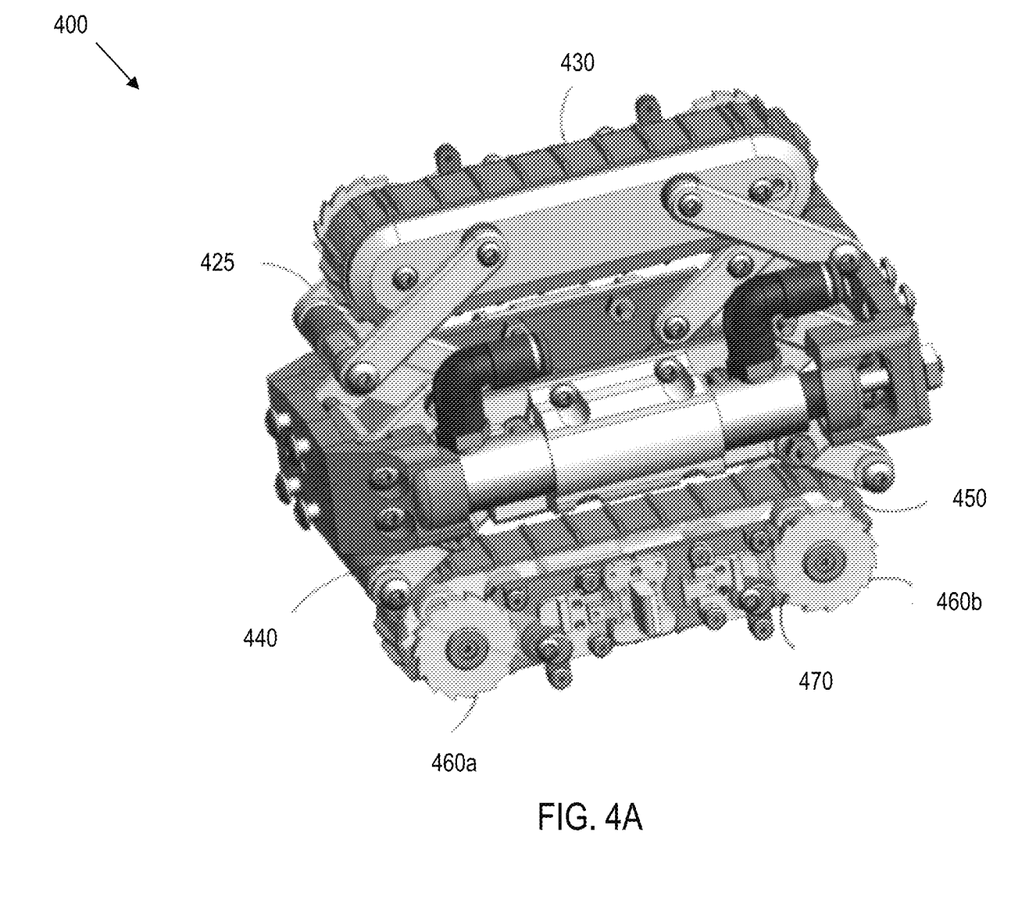
FIG. 4A is a diagram showing a perspective view for one embodiment of a modular replacement module with a ratcheting and locking mechanism.
Figure 4B:
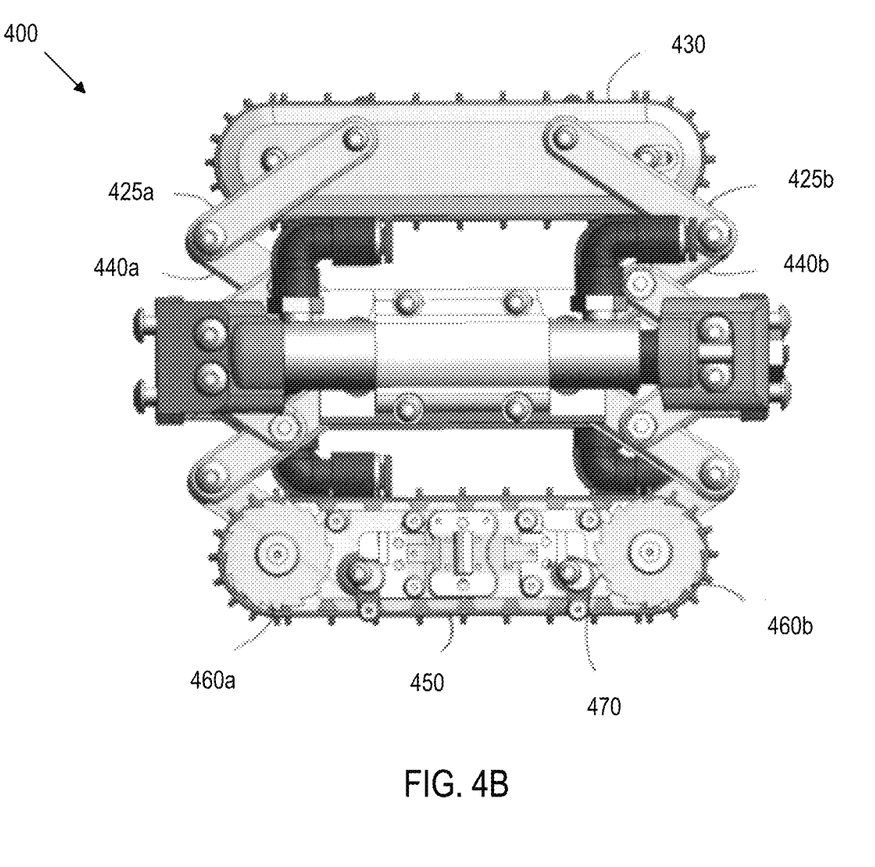
FIG. 4B is a diagram showing a side view for the embodiment of the modular replacement module with the ratcheting and locking mechanism.

Turning now to FIGS. 4A and 4B (collectively denoted as FIG. 4), another replaceable module 400 is shown with FIG. 4A showing a perspective view of the module 400 and FIG. 4B showing a side view of the module 400. Similar to the embodiments of FIGS. 1 through 3, the replaceable module 400 of FIG. 4 comprises legs 425a, 425b (collectively, 425) and lever arms 440a, 440b (collectively, 440) that, in combination, allow extension and retraction to engage or disengage a pipe under inspection.

However, unlike the embodiments of FIGS. 1 through 3, the replaceable module 400 of FIG. 4 comprises continuous treads 430 (also known as tank treads, caterpillar treads, or tracks), which provide the mobility mechanism for the module 400. As one can appreciate, by combining the treads 430 with other modes of mobility (e.g., wheel-driven mobility, inchworm mobility, fluid-flow driven mobility, screw-driven mobility, snaked mobility, propeller-driven mobility, walking mobility, etc., all of which are individually understandable to those having ordinary skill in the art). For example, if the rear leg assembly 115, 215 is detached from the front leg assembly 110, 210 and replaced with the module 400 having the continuous treads 430, then the benefits of both the legs 150, 250 and treads 430 are realized in a single robotic system.

As one can appreciate, aggregating different combinations of mobility modes (e.g., inchworm, snaked, walking, etc.) into a single system permits inspection of pipes that have changing environments along the path of inspection.

Ratcheting Track Embodiment

The embodiment of FIG. 4 further comprises gears 460a, 460b (collectively 460) and pawls 470, which in combination form a ratchet that can be locked. Of course, the ratcheting mechanism is applicable in both a forward direction (or clockwise direction) and a backward direction (or counterclockwise direction).

When making vertical climbs within a pipe, if the module 400 is required to stop and hold position at a particular location, then locking the ratcheting mechanism in both directions prevents both upward and downward movement of the module 400. Additionally, the ratcheting mechanism reduces energy requirements as compared to active braking systems because, once the pawl 470 engages the gear 460, no additional power is required to prevent the gear 460 from turning.

If the ratcheting mechanism is applied in one direction and the treads 450 have sufficient friction to prevent slippage, then the unidirectionality of the ratcheting mechanism almost guarantees that module 400 will travel in a single desired direction (and not in reverse). This type of unidirectionality is advantageous for upward climbs within a pipe because the ratcheting mechanism prevents downward slippage.

In the specific embodiment of FIG. 4, the module 400 has two (2) wheels (a first wheel and a second wheel) that are movably coupled to a central body on one side (a first side). The first wheel and the second wheel are aligned to cooperatively travel in substantially the same direction. Similarly, two (2) other wheels (a third wheel and a fourth wheel) that are movably coupled to the central body on a different side (a second side). The third wheel and the fourth wheel are aligned to cooperatively travel in substantially the same direction (usually the same direction as the first and second wheels). The two (2) wheels on the first side are surrounded by a tread (first tread), while the two (2) wheels on the second side are surrounded by another tread (second tread).

In some embodiments, each wheel is mechanically coupled to its respective ratchet, with each ratchet having its own gear 460 and pawl 470 for engaging the gear 460. Of course, it should be appreciated that not all wheels need to have a corresponding ratchet and that a ratcheting mechanism can be implemented on any one or more of the wheels.

For some embodiments, at least one (1) of the ratchets is configured to lock in a rotational direction (either clockwise or counterclockwise), thereby preventing movement of the robotic in-pipe inspection system 400 in a particular direction of travel (either forward or backward).

For other embodiments, at least two (2) of the ratchets are configured to lock in the same rotational direction, thereby providing greater security for the robotic in-pipe inspection system 400 to stop and hold position at a particular location.

For yet other embodiments, at least two (2) of the ratchets are configured to lock in different rotational directions, thereby preventing both forward and backward movement of the robotic in-pipe inspection system 400.

Remotely Deployable Inspection Drones

It should be appreciated that the robotic in-pipe inspection systems 100, 200 and the various replaceable modules 300, 400 are controllable wirelessly. For this reason, for some embodiments, the replaceable modules 300, 400 are smaller, detachable units that are ferried on a primary unit (or a tether) and deployable at different locations within a pipe. For example, when branching pipes (e.g., residential pipes) exist at different locations along a main pipe (e.g., main service pipe), the detachable unit detaches (from a tether, or from the primary unit) and travels to the branching pipes, behaving as smaller drone units that inspect the branching pipes.

For some embodiments, the detachable unit is a miniature version of the replaceable module 300, 400, which communicates with the remainder of the robotic in-pipe inspection system 100, 200. To conserve power, the detachable unit can be powered up when needed and powered down when not in use.

As one can appreciate, other embodiments contemplate multiple detachable units that are deployable at multiple different locations along a pipe. Multiple detachable units are also configurable to carry disposable sensors or attractable trackers that are dropped or left at various locations within the pipe, thereby providing near-real-time information even when the robotic in-pipe inspection system 100, 200 eventually exits from the pipe. Of course, the detachable unit itself can be disposable, should the value of continuously gathering near-real-time information outweighs the value of the disposable unit.

As shown in FIGS. 1 through 4 and their respective accompanying detailed descriptions, the robotic in-pipe inspection system 100, 200 (along with the replaceable module 300, 400) allows for a front that moves independently of the rear, thereby allowing the system to accommodate sharp changes in direction or branching within a pipeline or surface infrastructure. The independently controllable front and rear of the robotic in-pipe inspection system 100, 200, 300, 400 allows for inspection of off-path branches in pipes or lateral areas that are not normally inspectable with conventional piggable systems. Consequently, the disclosed systems and processes of FIGS. 1 thorough 4 allow for more comprehensive inspection of pipelines and constrained surfaces and, thus, a greater ability to prevent failures or mitigate damage.

DIFFERENT EMBODIMENTS, MODIFICATIONS, AND ALTERATIONS

The shaft controller (not shown), front controller, rear controller, front sensor, and rear sensor may be implemented in hardware, software, firmware, or a combination thereof. In the preferred embodiment(s), these sensors or controllers are implemented in software or firmware that is stored in a memory and that is executed by a suitable instruction execution system. If implemented in hardware, as in an alternative embodiment, the controllers or sensors can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The controllers are controllable via software programs, which comprise ordered listings of executable instructions for implementing logical functions. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Information may also be supplied through communication systems placed in, above, or around the infrastructure being inspected. This could include wireless communications, physical communication (e.g., tapping signals), or a combination thereof that may have different systems within different modules of the same robot or have mixed systems between subcomponents and launched secondary robots.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:
1. A robotic in-pipe inspection system, comprising:
  a center shaft comprising:
    a shaft front portion;
    a shaft rear portion; and
    a shaft connector mechanically coupling the shaft front portion to the shaft rear portion at a shaft angle, the shaft angle ranging from ninety degrees (90°) to one-hundred-and-eighty degrees (180°);
  a front leg assembly operatively coupled to the shaft front portion, the front leg assembly comprising:
    a front leg connector mechanically coupled to the shaft front portion;
    a first front leg comprising a proximal end and a distal end, the proximal end of the first front leg being mechanically and pivotally coupled to the front leg connector at a first front angle, the first front leg being at a first front azimuthal position;
    a first front contact means for contacting an inner surface of a pipe, the first front contact means being mechanically coupled to the distal end of the first front leg;
    a front slider slidably coupled to the shaft front portion; and a first front lever arm pivotally coupled to the first front leg, the first front lever arm further being pivotally coupled to the front slider;

a second front leg comprising a proximal end and a distal end, the proximal end of the second front leg being mechanically and pivotally coupled to the front leg connector at a second front angle, the second front leg being at a second front azimuthal position;

a second front contact means for contacting the inner surface of the pipe, the second front contact means being mechanically coupled to the distal end of the second front leg;

a second front lever arm pivotally coupled to the first front leg, the first front lever arm further being pivotally coupled to the front slider;

a rear leg assembly operatively coupled to the shaft rear portion, the rear leg assembly comprising:

a rear leg connector mechanically coupled to the shaft rear portion;

a first rear leg comprising a proximal end and a distal end, the proximal end of the first rear leg being mechanically and pivotally coupled to the rear leg connector at a first rear angle, the first rear leg being at a first rear azimuthal position;

a first rear contact means for contacting the inner surface of the pipe, the first rear contact means being mechanically coupled to the distal end of the first rear leg;

a rear slider slidably coupled to the shaft rear portion; and a first rear lever arm pivotally coupled to the first rear leg, the first rear lever arm further being pivotally coupled to the rear slider;

a second rear leg comprising a proximal end and a distal end, the proximal end of the second rear leg being mechanically and pivotally coupled to the rear leg connector at a second rear angle, the second rear leg being at a second rear azimuthal position;

a second rear contact means for contacting the inner surface of the pipe, the second rear contact means being mechanically coupled to the distal end of the second rear leg;

a second rear lever arm pivotally coupled to the first rear leg, the first rear lever arm further being pivotally coupled to the rear slider;

a shaft controller operatively coupled to the shaft front portion and the shaft rear portion, the shaft controller for controlling the shaft angle;

a front controller operatively coupled to the front leg assembly, the front controller for controlling the first front angle, the front controller further for controlling the second front angle; and a rear controller operatively coupled to the rear leg assembly, the rear controller for controlling the first rear angle, the rear controller further for controlling the second rear angle;

a targeted field-of-view inspection camera for visually inspecting an area of interest within the pipe; and a robot-body-facing camera for visually examining the robotic in-pipe inspection system.

2. The first front contact means being one selected from a group consisting of:
 a foot;
 a wheel;
 a tread; and
 a sensor.

3. The robotic in-pipe inspection system of claim 2, wherein the first front contact means is detachable.

4. The robotic in-pipe inspection system of claim 1, wherein at least one of the shaft controller, the front controller, and the rear controller is controlled remotely.

5. The robotic in-pipe inspection system of claim 1, wherein the inner surface of the pipe comprises a material that is selected from the group consisting of:
 iron;
 wood;
 plastic;
 glass;
 polymer;
 ceramic;
 composite; and
 a coating material.

6. The robotic in-pipe inspection system of claim 1, further comprising a data transmitter operatively coupled to the targeted field-of-view inspection camera, the data transmitter for transmitting data that is collected by the targeted field-of-view inspection camera.

7. The robotic in-pipe inspection system of claim 1, further comprising a data transmitter operatively coupled to the robot-body-facing camera, the data transmitter for transmitting data that is collected by the robot-body-facing camera.

8. The robotic in-pipe inspection system of claim 1, further comprising a power supply mounted on the robotic in-pipe inspection system.

9. The robotic in-pipe inspection system of claim 1, wherein the robotic in-pipe inspection system is a parasitically powered system that is powered by flow fields surrounding the system.

10. A robotic in-pipe inspection system, comprising:
 a center shaft;
 a front assembly operatively coupled to the center shaft;
 a rear assembly operatively coupled to the center shaft;
 a shaft controller operatively coupled to the center shaft, the shaft controller for controlling the center shaft;
 a front controller operatively coupled to the front assembly, the front controller for controlling the front assembly independently of the center shaft;
 a rear controller operatively coupled to the rear assembly, the rear controller for controlling the rear assembly independently of the center shaft, the rear controller further for controlling the rear assembly independently of the front assembly;
 a targeted field-of-view inspection camera for visually inspecting an area of interest within a pipe; and
 a robot-body-facing camera for visually examining the robotic in-pipe inspection system.

11. The robotic in-pipe inspection system of claim 10, wherein the robot-body-facing camera visually captures a part of the robotic in-pipe inspection system.

12. The robotic in-pipe inspection system of claim 10, wherein the robot-body-facing camera visually captures the robotic in-pipe inspection system in its entirety.

13. The robotic in-pipe inspection system of claim 10, wherein the robot-body-facing camera is one selected from the group consisting of:
 an infrared (IR) camera;
 an ultraviolet (UV) camera;
 a remotely controllable camera;
 a high-resolution camera;
 a forward-facing rear camera;
 a backward-facing front camera;
 a camera with a wide-angle lens;

a camera with a fish-eye lens; and
a camera with a rectilinear lens.

14. The robotic in-pipe inspection system of claim 10, wherein the targeted field-of-view inspection camera is one selected from the group consisting of:
a forward-facing front camera;
a backward-facing rear camera;
a high-resolution camera;
an infrared (IR) camera;
an ultraviolet (UV) camera; and
a remotely controllable camera.

15. The robotic in-pipe inspection system of claim 10, wherein the targeted field-of-view inspection camera visually captures an environmental context within the pipe.

16. The robotic in-pipe inspection system of claim 10, wherein the targeted field-of-view inspection camera visually detects conditions within the pipe.

17. The robotic in-pipe inspection system of claim 10, wherein the targeted field-of-view inspection camera visually detects obstacles within the pipe.

18. The robotic in-pipe inspection system of claim 10, wherein the robot-body-facing camera permits remote monitoring of the robotic in-pipe inspection system.

19. The robotic in-pipe inspection system of claim 10 being configured for remote manual control.

20. The robotic in-pipe inspection system of claim 10, further comprising a tether for remote manual control.

* * * * *